Nov. 23, 1948.  J. M. LAFFERTY  2,454,560
ULTRA HIGH FREQUENCY ELECTRIC DISCHARGE DEVICE
Filed Oct. 2, 1942  2 Sheets-Sheet 1.
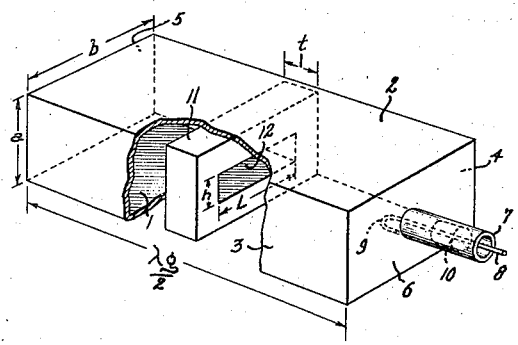
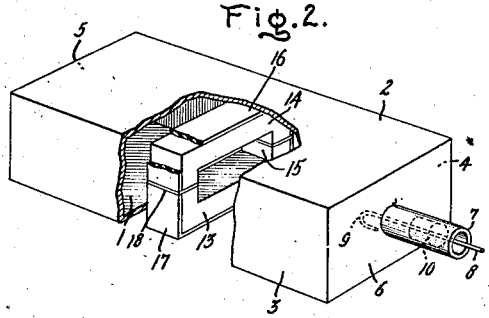
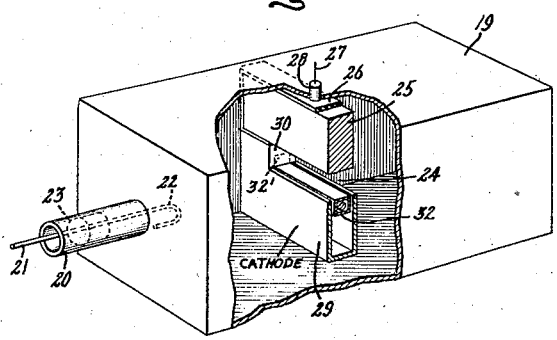
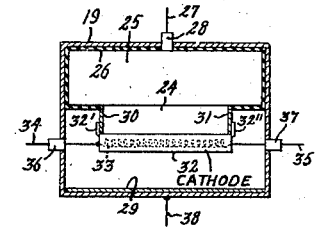
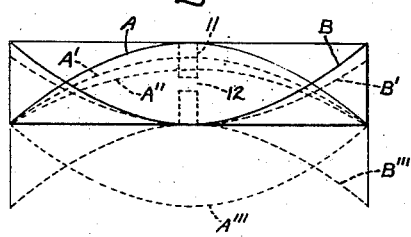
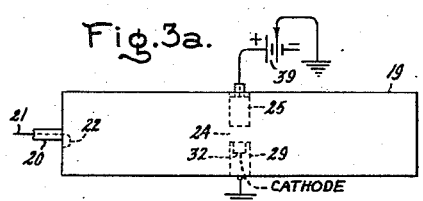
Inventor:
James M. Lafferty,
by Harry E. Dunham
His Attorney.

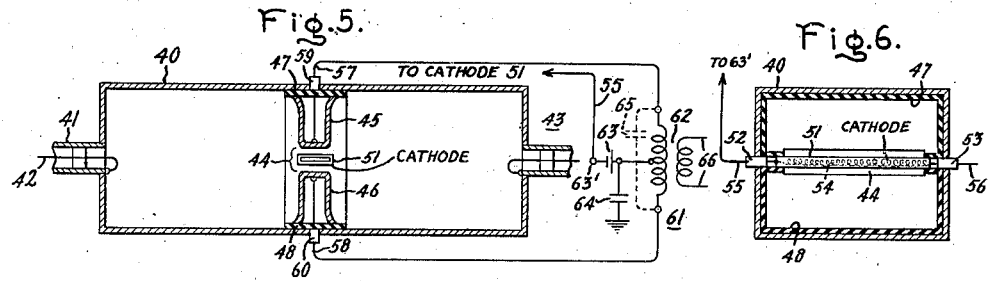
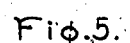
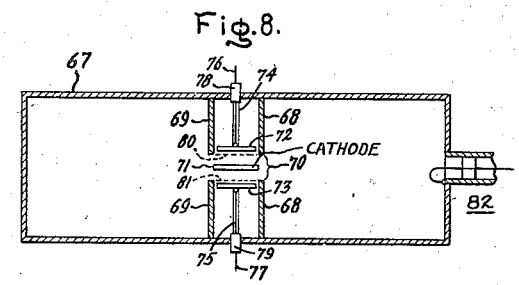
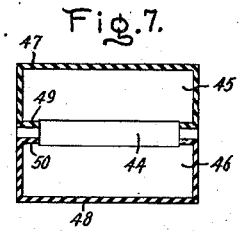
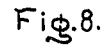
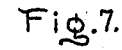
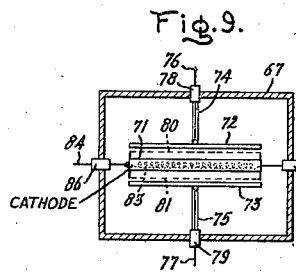
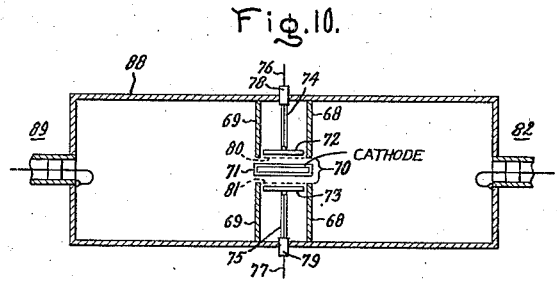
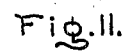
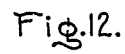
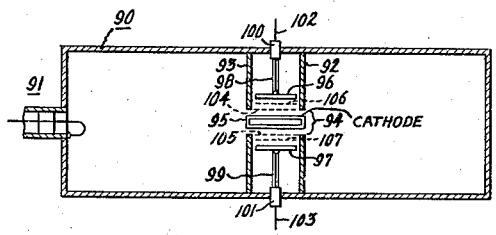
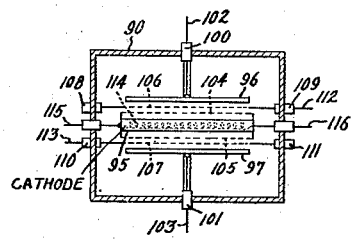
Inventor:
James M. Lafferty,
by Harry E. Dunham
His Attorney.

Patented Nov. 23, 1948

2,454,560

UNITED STATES PATENT OFFICE 2,454,560

ULTRA HIGH FREQUENCY ELECTRIC DISCHARGE DEVICE

James M. Lafferty, Colonie, N. Y., assignor to General Electric Company, a corporation of New York Application October 2, 1942, Serial No. 460,523

52 Claims. (Cl. 315—6)

My invention relates to space resonant cavities and more particularly to ultra high frequency electric discharge devices of the space resonant type.

Because of the ever increasing demand for electric discharge devices suitable for use in the ultra high frequency field, it has become apparent that many of the heretofore conventional types of discharge devices are inherently unsuited for use in this field. One of the factors which renders many of the prior art arrangements unsuited for use in the ultra high frequency field is the electrode construction and input conductors which cause a substantial and prohibitive decrease in the input impedance of the devices. In accordance with the teachings of my invention described hereinafter, I provide new and improved electric discharge devices wherein many of the disadvantages of the prior art arrangements are obviated and which afford additional advantages without sacrificing conductance characteristics of the devices.

It is an object of my invention to provide new and improved electric discharge devices for use in the ultra high frequency field.

It is another object of my invention to provide new and improved space resonant devices.

It is still another object of my invention to provide new and improved electric discharge devices of the space resonant type comprising an enclosed section of a hollow-pipe type dielectric wave guide which comprises means, such as a resonant aperture, for accentuating the potential due to the electromagnetic waves within the cavity.

It is a still further object of my invention to provide new and improved space resonant electric discharge devices of the hollow-pipe type which comprises means, such as a resonant aperture, for accentuating certain characteristics of the electromagnetic waves within the cavity of the device, and also includes electric or electronic discharge means for obtaining a suitable electrical quantity which varies in accordance with a predetermined characteristic of the electromagnetic waves within the cavity.

It is a still further object of my invention to provide new and improved space resonant cavity type electric discharge devices suitable for operation as rectifiers, detectors, oscillators and converters.

Briefly stated, in the illustrated embodiments of my invention I provide new and improved electric discharge devices of the space resonant or cavity type which may be characterized as being an enclosed section of a dielectric wave guide and which include means, such as a resonant aperture or slot, tuned substantially to the frequency of the exciting means for the cavity to effect a substantial accentuation or concentration of the potential difference due to the electromagnetic waves within the cavity. Preferably, the structure including the resonant aperture or slot is positioned within or near the vicinity of the potential-maximum of the standing electromagnetic wave within the cavity, thereby utilizing to the greatest advantage the maximum potential difference available within the cavity.

Due to the fact that the resonant aperture or slot is tuned to the frequency of the exciting means or the input electrode means, the input impedance of the discharge device, considered as a whole, remains at a substantially large value thereby obviating the disadvantages of the prior art arrangements. Furthermore, I provide anode and cathode structures which may constitute a part of the wall structure including the resonant aperture, of sufficient dimensions so that each of the discharge devices affords a large conductance and so that the conductance of the discharge device is not sacrificed in obtaining high input impedance.

In accordance with a still further teaching of my invention, the electric discharge paths or the electronic discharge paths associated with the resonant cavity may comprise electrostatic control means, such as grids, interposed between the cathode and anode structures associated with the resonant aperture. The wall structure comprising the resonant aperture may be designed to act as a shielding means for electrically insulated anode structure, or structures, and the electrostatic control means may also be shielded in this manner.

In accordance with a still further feature of my invention, I provide a new and improved high frequency diode oscillator comprising a metallically bound space resonant cavity of the hollow-pipe type which includes a wall structure comprising a resonant aperture or slot tuned substantially to the natural resonace frequency of the cavity to effect a concentration of the potential due to electromagnetic field therein. An electric discharge path comprising an anode and a cathode is associated with the aperture, the transit time of the electrons transmitted from the cathode to the anode being correlated with respect to the natural resonance frequency of the cavity so that the electric discharge path has a negative-resistance characteristic sufficient to maintain the discharge device, as a whole comprising the cavity, in sustained oscillation. More particularly, the transit time of the electrons is correlated with respect to the electric component of the electromagnetic field within the cavity so that appreciable energy is extracted from the electron beam and delivered to the electromagnetic field of the cavity. In this type of arrangement, output electrode means may be associated with the cavity and the energy derived from the cavity may be utilized by an external circuit.

For a better understanding of my invention, reference may be had to the following description taken in connection with the accompanying drawings, and its scope will be pointed out in the appended claims. Fig. 1 diagrammatically illustrates one feature of my invention wherein the transverse wall comprising the resonant aperture is positioned at an optimum point in the cavity structure and Fig. 1a represents an operating characteristic thereof. Fig. 2 shows an alternative structure for the wall which includes the resonant aperture; Figs. 3 and 4 represent improved anode and cathode structures which may cooperate to form an electric discharge path and which may constitute portions of the wall; Fig. 3a represents one way in which the arrangement of Figs. 3 and 4 may be operated as a diode oscillator; Figs. 5, 6 and 7 diagrammatically illustrate a further embodiment of my invention which is capable of operation either as a diode oscillator, rectifier or as a converter, and includes a pair of electrically insulated anode elements which constitute portions of the wall structure which defines the resonant aperture; Figs. 8 and 9 disclose still further modifications of my invention wherein electrostatic control means may be associated with the electric discharge paths. The arrangements of Figs. 8 and 9 may be operated as a detector or rectifier. Fig. 10 illustrates a still further arrangement wherein a triode construction of the electric discharge path constitutes part of an electric discharge device suitable for conversion purposes such as frequency conversion or mixing purposes. Figs. 11 and 12 represent still further modifications of my invention wherein the electric discharge paths are provided with externally controllable electrostatic control means which are shielded by lying between metallic partitions of the wall defining structure.

Referring now to Fig. 1 of the accompanying drawings, I have there illustrated certain fundamental aspects of my invention, particularly as applied to a space resonant cavity which may be an isolated section of a dielectric wave guide of the hollow-pipe type. More particularly, the space resonant cavity may comprise a metal bound region defined by metallic walls having a relatively large conductivity, such as copper or brass walls. Although my invention may be applied with equal facility to resonant cavities of various configurations and cross section, for the purpose of facilitating explanation of my invention I have chosen to represent my invention as being applied to a space resonant cavity of rectangular cross section comprising a base member 1 and a top plate member 2 and having metallic sides 3 and 4 terminated at each end by metallic walls 5 and 6. It is to be understood that the entire structure is sealed and the various elements thereof may be soldered or welded together. The region defined by the structure may be evacuated to a desired low pressure through a tubulation (not shown). Electrode means, such as a concentric or coaxial transmission line comprising a hollow tube member or conductor 7 and a concentric conductor 8 may be connected to the resonant cavity; conductor 8 extends into the enclosed region and is provided with a loop 9. The electrode means may be sealed by providing a glass bead insulator 10 within conductor 7 and which is sealed thereto and sealed to conductor 8.

Although my invention may be applied for the utilization of various types of electromagnetic waves, such as various types of E waves and H waves, in the following description of my invention the apparatus will be described particularly with reference to an $H_{0_1}$ type wave.

I provide within the enclosed chamber or region of the structure shown in Fig. 1 a transverse metallic wall 11; that is, the wall lies in a plane substantially transverse to the direction along which electromagnetic waves would be propagated in the event the cavity comprised a part of a hollow-pipe dielectric wave guide. The transverse wall is provided with a resonant aperture or slot 12 which has an appreciable dimension or longitudinal dimension L substantially perpendicular to the direction of wave propagation through the cavity. The resonant aperture 12 has a height $h$ which is correlated with respect to the dimension L so that the aperture 12 is resonant with respect to the natural frequency of the cavity, or resonant with respect to the frequency of the exciting means connected to the electrode means comprising conductors 7 and 8. The frequency to which the aperture 12 is resonant depends upon the particular purpose for which the apparatus is used. This feature will be more fully appreciated in connection with the various embodiments of my invention to be described presently.

The length of the resonant cavity is preferably constructed to be substantially equal to an odd or even multiple of a half-wave length of the natural resonance frequency of the cavity itself, or an odd or even multiple of the frequency of the excitation means or input electrode means associated with the cavity.

In order to set forth several fundamental aspects of the design of the resonant cavity embodying certain features of my invention, it is believed that it may be helpful to review briefly some of the principal factors concerning the propagation of electromagnetic waves through dielectric wave guides of the hollow-pipe type. It is now well appreciated that electromagnetic waves may be sustained or propagated through the interior of a metallic member or pipe of conductive material which contains a dielectric medium, if the frequency of the exciting electromagnetic waves is greater than the critical minimum frequency established principally by the transverse dimensions of the guide. Stated in other words, for frequencies below the critical minimum frequency the wave is rapidly attenuated and is not transmitted through the guide or into a confined chamber. Above the critical frequency, the wave is propagated in the desired direction and the wave assumes a time-space distribution through the guide established principally by the wave length of the exciting impulses for the guide and the transverse dimensions of the guide.

The phase constant $\beta$ of the electromagnetic waves established within a guide of rectangular cross sectional height $a$ and base dimension $b$ may be expressed as:

$$\beta = \left[\omega^2 \mu_1 \epsilon_1 - \left(\frac{n\pi}{a}\right)^2 - \left(\frac{m\pi}{b}\right)^2\right]^{\frac{1}{2}} \quad (1)$$

where $\omega$ is the angular velocity of the wave propagated through the medium which may be considered as air for the purposes of the present discussion, that is $\omega = 2\pi f$ where $f$ is the frequency of the wave, $\mu_1$ is the permeability of the medium, and $\epsilon_1$ is the effective dielectric constant of the medium. The quantities $n$ and $m$ are, of course, the order and mode of the particular wave under discussion.

The critical frequency $f_0$ may be defined as follows:

$$f_0 = \frac{1}{2\sqrt{\mu \epsilon_1}} \left[ \left(\frac{n}{a}\right)^2 + \left(\frac{m}{b}\right)^2 \right]^{1/2} \quad (2)$$

The phase wave length of the electromagnetic waves established within the guide or cavity may be characterized as:

$$\lambda = \frac{2\pi}{\beta} \quad (3)$$

Of course, the dimensions of the cavity may be chosen so that its natural frequency is equal to $\lambda_g$.

It will be noted that in Equations 1 and 2 the effective dielectric constant is employed in determining the phase constant and the critical frequency. As will be discussed presently, it is important to utilize the effective dielectric constant which is determined by the presence of a region of charged electrical particles or an electron beam, where such a region is present.

It is important to note that the electromagnetic waves established within the cavity shown in Fig. 1 are standing electromagnetic waves due to the fact that the principal dimension or length of the cavity is chosen to be a multiple of a half-wave length of the natural resonance wave length of the cavity. As is well appreciated, the potential and current waves are displaced in time and space by 90 electrical degrees, the potential nodes being at the ends of the cavity and the current node being at a point midway between the ends. Viewed in another manner, the resonant cavity of the particular configuration and dimensions illustrated may be considered as constituting a short-circuited dielectric guide of the hollow-pipe type having a length equal to a multiple of a half-wave length of the electromagnetic waves sustained thereby.

The curve shown in Fig. 1a may be referred to in order to obtain a visual impression of the potential and current distribution in the resonant cavity shown in Fig. 1. The potential curve A is shown with respect to the cavity and a transverse wall 11. It will be observed that I position the transverse wall 11 including the resonant aperture 12 within the vicinity of the potential-maximum of the standing wave within the cavity in order to utilize most effectively the potential accentuation or concentration characteristics of the resonant aperture. Curve B represents the current distribution.

Attention is directed to the fact that curves A and B in Fig. 1a illustrate the manner in which the current and potential vary as a function of the length of the cavity. The curves A', A'' and A''' represent the manner in which the potential varies as a function of time, the potential undergoing a complete cyclic variation in magnitude but remaining fixed in space. For example, at a time 180 electrical degrees displaced from that indicated by curve A, the potential will have completely reversed to a position indicated by the dotted curve A'''.

The current distribution and time-variation thereof are illustrated by the B curves; that is, these curves are utilized to show generally the longitudinal distribution of the current as a function of time. The current varies in time-quadrature with the voltage, and the solid curve B represents the time distribution of the current at an instant corresponding to curve A. The current intensity varies sinusoidally with respect to time, and at a later time will assume the distribution indicated by dotted curve B' corresponding to potential curve A'. Of course, at a time 180 electrical degrees displaced from the time represented by the solid curve B, the current will have a value and distribution as indicated by the dotted curve B''', corresponding in time relation to curve A'''.

As stated briefly above, the dimensions $h$ and $L$ of the resonant aperture of the slot 12 may be tuned to be resonant to a definite frequency, that is, may be resonant to the frequency of the external means which excites the cavity, or may be tuned to be resonant to the natural frequency of the cavity, depending upon the type of device to which my invention is applied.

The total impedance $Z_0$ of the cavity, may be defined as:

$$Z_0 = \frac{\epsilon_1 \pi c}{2} \frac{\lambda_g}{\lambda} \frac{a}{b} \quad (4)$$

where $\epsilon_1$ is the effective dielectric constant of the medium and $c$ is the velocity of light. If the total impedance within the cavity is substantially constant, the presence of the wall 11 will cause substantially no reflection. To maintain this impedance constant for changes in cavity dimensions $a$ and $b$, one must have at any wave length the following relationship:

$$\frac{a}{b} \lambda_g = \text{constant} = k \quad (5)$$

As stated above, the aperture or slot is resonant. It is appreciated that the natural frequency or the resonance frequency of the slot will be affected by the dielectric constant of the medium within which the slot is placed. Furthermore, the natural resonance frequency of this slot will vary as a function of the effective dielectric constant of the medium as modified and established by the presence in the region of charged electrical particles, such as electrons, which constitute the beam transmitted from the cathode to the anode. This variation in the dielectric constant will be appreciated by considering the fact that the effective distributed capacitance of the slot with an electron beam present is less than that when no beam is present. As a result, in the computation of the dimensions $h$ and $L$ of the slot, the effect of the region of charged particles must be taken into consideration. Viewed as a general matter, it may be said that for a slot of given height and length, the establishment of a region of charged particles will effect a reduction or decrease in the magnitude of the distributed capacitance of the slot inasmuch, as is well known, the capacitance is directly proportional to the dielectric constant and inversely proportional to the distances between the surfaces involved. Consequently, if a slot is designed to be resonant to an electromagnetic wave of particular frequency with no region of charged particles present, upon the establishment of such a region the effective height or dimension $h$ of the slot must be decreased in order to obtain a resultant capacitance to resonate with the distributed inductance.

The effective dielectric constant of the medium, which should be taken into consideration in the determination of $\lambda_g$ and the dimensions of the resonant aperture or slot, may be generally defined as being a function of the difference of the dielectric constant of the medium with no electron beam present and a quantity which is directly proportional to the number of charged particles per unit volume, the square of the unit charge of each particle and inversely proportional to the mass of each charge and some function of the frequency.

If the thickness $t$ of the transverse wall 11 is made a small fraction of the wave length $\lambda_g$, there will be a reflection from the discontinuity so produced, but this reflection is substantially neutralized by the exit reflection on the opposite side of the slot. Therefore, the total impedance of the cavity itself is the same as that of the slot since the reflection produced at the entrance of the slot is just cancelled by the reflection from the exit.

Referring again to Fig. 1, the length of the cavity is substantially $$\frac{\lambda_g}{2}$$

where $\lambda_g$ may be considered as the wave length of the radiation within the cavity. The placement or position of the slot 12 within the center of the cavity will not materially affect its electrical properties provided the dimensions of the slot are correct. As the height $h$ of the slot approaches zero as a limit, the length L thereof approaches one half the free space wave length of the radiation within the cavity. As the height $h$ is increased, L becomes correspondingly larger. If this relationship is maintained, the radiation is transmitted through the resonant slot with negligible attenuation provided the thickness $t$ of the wall 11 is substantially smaller or negligible with respect to $\lambda_g$. The entire voltage which would normally appear between the centers of the top and bottom of the cavity appears across the gap when the gap is tuned to be resonant. Therefore, any radio frequency or ultra high frequency voltage thus provided across the gap may be utilized as explained hereinafter to operate any of several electric or electronic discharge devices.

In Fig. 2 I have there illustrated an alternative construction for the transverse wall which provides a resonant aperture or slot. The construction there illustrated may be employed where it is desired to provide insulation between one part of the wall to utilize that part as an insulated electrode of an electric discharge device constituting an element of the system. For example, the transverse wall may comprise a pair of elongated U-shaped metallic members 13 and 14 which define a resonant slot 15. The members 13 and 14 may be insulated from each other or may be insulated from the metallic walls of the cavity by employing spacers 16, 17 and 18. Of course, it is to be understood that in some modifications of my invention it is necessary to insulate only one of the sections of the transverse wall, in which case the other sections may be in physical contact with and electrically connected to the metallic walls of the cavity.

Fig. 3 diagrammatically represents an embodiment of my invention as applied to an ultra high frequency electric discharge device of the space resonant or cavity type which may be employed in diversified ways. For example, the construction illustrated may be employed as a diode rectifier, a diode detector and, as shown in Fig. 3a, may be employed as a diode oscillator. In the arrangement of Fig. 3, I provide a metallic space resonant cavity 19 of rectangular cross section and which may be considered as constituting an isolated or defined section of a dielectric wave guide of the hollow-pipe type. Electrode means, which may be either input electrode means or output electrode means, depending upon the manner of utilization, are associated with the cavity and comprise a concentric transmission line including a tubular conductor 20 and a concentric or inner conductor 21 which extends as a loop 22 into the interior of the cavity. The entire cavity may be evacuated to a desired low pressure and sealed, and the concentric transmission line is provided with a glass seal 23. Conductor 20 may be welded or soldered to a circular opening in the end wall of the cavity of substantially the same dimension as the inside diameter of the tube.

I provide within the interior of the resonant cavity, and preferably within the region of the potential-maximum of the standing electromagnetic wave within the cavity, a transverse metallic wall structure which is shown partially in cross-section. It will be appreciated that the transverse structure extends entirely across the cavity in a manner similar to that shown in Figs. 1 and 2 and defines a resonant aperture 24 tuned substantially to the natural resonance frequency of the cavity or tuned to the input excitation frequency. The upper portion of the transverse wall which defines one of the principal boundaries of the aperture 24 may comprise a solid metal block 25 which is electrically insulated from the walls and top of the cavity by an insulating spacer 26 and serves as an anode for an electric discharge or an electronic discharge path, the function of which is explained immediately hereinafter. Output conductor means may be connected to the anode block 25 and may comprise a conductor 27 which is connected to block 25 through an insulator 28.

The lower portion of the transverse wall structure may comprise a hollow metallic U-shaped member 29 which is physically in contact with and conductively connected to the side walls of the cavity. It will be observed, however, that the insulator 26 extends below the anode block 25 to insulate the lower portion of the transverse structure from the upper portion. The ends of the resonant aperture 24 may be terminated or bounded by metal partitions 30 and 31. (See Fig. 4.)

As a means for producing a source of charged particles or a source of electrons to cooperate with the anode block 25, I provide a thermionic cathode 32 which lies between the vertical or upright sides of member 29 and is spaced therefrom. The cathode structure may be supported in spaced relation in the manner illustrated by means of L-shaped metal elements or tabs 32' and 32'' so that the upper surface of the cathode 32 constitutes partially in effect a lower horizontal boundary of the resonant aperture 24 and is shielded by member 29.

The above described structure may be more fully appreciated by referring to the cross sectional view of the transverse wall structure illustrated in Fig. 4. The cathode 32 is provided with a heating element 33, the terminals of which are supported and made externally accessible by a pair of conductors 34 and 35 and are insulated from the body of the cavity by means of sealing insulators 36 and 37. Inasmuch as the cathode structure is conductively connected to the bottom and side walls of the cavity, the other output terminal may be attached at any desired place on the exterior of the cavity. In Fig. 4 I have shown a second output conductor 38 connected to the bottom of the cavity. Of course, it will be appreciated that if desired a suitable sealing insulator and conductor construction may be employed to derive the output voltage from the interior of the cavity.

The electric discharge device shown in Figs. 3 and 4 will be first considered when it is operating as a rectifier of the high frequency electromagnetic waves established therein when the cavity is excited by energizing the electrode means comprising conductors 20 and 21. As explained above, upon excitation of the cavity above the critical frequency there will be established within the cavity a standing electromagnetic wave and the resonant aperture 24 effects a concentration of the potential due to the wave along the length thereof. That is, the voltage difference will appear between the anode block 25 and the cathode element 32, particularly the horizontal edges defining the aperture. Inasmuch as the electric discharge path comprising the thermionic cathode 32 and anode 25 is unidirectional, the device will rectify those half cycles of the high frequency wave during which the anode is positive in potential relative to the cathode. Consequently, a rectified or unidirectional voltage which is a function of the potential difference across slot 12, will appear across output conductors 27 and 38. The electric discharge device shown in Fig. 3 may also be operated as a detector for electromagnetic waves of high frequency. For example, upon the proper excitation of the cavity by energization of the electrode means including conductors 20 and 21, the device will produce across conductors 27 and 38 a unidirectional voltage representative of the waves established within the cavity and also representative of the type and character of energization of the electrode means.

In Fig. 3a I have diagrammatically illustrated in simplified form the manner in which the structure shown in Fig. 3 may be operated as a diode oscillator, corresponding elements having been assigned like reference numerals. In the arrangement of Fig. 3a, the electrode means comprising conductors 20 and 21 are employed as output electrode means. The input to the device comprises a source, such as a battery 39, for applying a unidirectional voltage between the anode 25 and the cathode element 29.

In this embodiment of my invention, the transit time of the electrons of the discharge path constituting cathode 32 and anode 25 is established so that the discharge path affords a negative-resistance characteristic to maintain the system in sustained oscillation supplying energy to the output electrode means. The transit time or angle of the electrons in moving from the cathode 32 to anode 25 may be controlled in any of several ways and I have chosen to represent one way as comprising means for adjusting the anode voltage by controlling the effective potential of the battery 39.

A fundamental consideration for maintaining a device of the nature shown in Fig. 3a in oscillation comprises a correlation of the electron transit time with respect to the time variation of the electromagnetic field of the waves within the cavity. More particularly, it may be said that it is necessary to establish a predetermined phase relationship between the electrons impinging upon anode 25 and the instantaneous value of the electric field incident to the waves. One way in which this may be more fully appreciated is by considering that it is necessary for the electromagnetic waves to enter the vicinity of the anode at such a time during the cyclic variation of the electromagnetic field that the electrons oppose the electric component of the electromagnetic field, that is deliver energy to the field. During such action it will be understood that inasmuch as the electrons are decelerated due to the opposing effect of the electromagnetic field, energy will be extracted from the electrons and delivered to the electromagnetic field within the cavity, or delivered to the output electrode means.

The transit time of the electrons in progressing from cathode 32 to anode 25 may be any one of several ranges of values which may generally be defined as a function of the accelerating voltage effective between anode and cathode, the distance between the anode and cathode, and the geometry of the cavity including the anode and cathode structure. One of the most readily obtainable values of transit angle lies in the neighborhood of $$\frac{5\pi}{2}$$

radians based on the natural resonance frequency of the cavity. It will be noted that this transit time is 5 quarter cycles. Generally speaking, the transit time should be an odd number of quarter cycles based upon the frequency of the electromagnetic waves within the cavity. For example, the transit time may be 5, 9, 13 or 17 quarter cycles of the natural frequency of the cavity.

Where the arrangement of Fig. 3a is operated as a diode oscillator, the question will naturally arise in the mind of the reader as to the source of excitation which modulates the electron beam density in order to obtain the desired negative-resistance characteristic of the electric discharge path. The voltages acting upon the electrons in the beam, neglecting the space charge effect, may be resolved into two components, one of which is the unidirectional component of voltage effective across the anode and cathode and which is due to battery 39; and the other component of the voltage is the alternating component of voltage which is derived from the standing wave within the cavity. In other words, neglecting the effect of the space charge, the alternating component of the voltage derived from the standing electromagnetic wave is effective to produce alternate incremental and decremental changes in acceleration of the electrons moving from the cathode 32 to the anode 25 thereby producing regions of different electron beam density. The control of the electron beam density is obtained by the interaction of the electron beam itself with the standing electromagnetic wave within the cavity and by virtue of the establishment of the electron transit time or the transit angle, the latter being defined relative to the angular velocity of the standing wave. Inasmuch as the transit time of the electrons is chosen so that the net effect of the electromagnetic field thereon is decelerating, energy will be extracted from the electron beam and delivered to the field, the times at which the regions of large electron density impinge upon the anode being established to effect a lowering of the anode potential when the alternating component of the electric field is negative or repelling. Physically, this means that a negative resistance characteristic is produced which, and so long as the effect thereof is greater than the losses within the cavity and the output circuit losses, will sustain the device itself and associated apparatus in oscillation.

In Fig. 5 I have diagrammatically illustrated a still further embodiment of my invention which may be employed as a double diode rectifier, a detector, or frequency changer. Fig. 5 illustrates a cross sectional view of a metal bound space resonant cavity or device 40 comprising electrode means, such as a concentric transmission line including a tubular conductor 41 and an inner conductor 42. Where the device is intended to be operated as a frequency changer or mixer, the cavity may be provided with an additional electrode means 43 such as a concentric transmission line.

I also provide within the cavity, preferably within the vicinity of the potential maximum point, a transverse wall structure defining a resonant aperture or slot 44 tuned substantially to the natural resonance frequency of the cavity or tuned to the frequency of the input excitation. The form of the resonant aperture or slot 44 may be more fully appreciated by referring to the cross sectional views shown in Figs. 6 and 7.

The transverse wall may be formed by employing a pair of hollow metallic members 45 and 46, of U cross section, and which may be flared slightly at the open ends thereof, and which are insulated from the top portion and side walls by means of spacing insulators 47 and 48, also shown in Figs. 6 and 7. The spacing insulators 47 and 48 may be provided with reentrant portions or flanges 49 and 50 in order to provide spaces through which externally accessible conductors, to be described presently, may be positioned.

Intermediate the horizontal faces of the members 45 and 46, which operate as anode structures, I provide a thermionic cathode 51 which may be maintained in spaced relation between the anode elements by means of sealing glass insulators 52 and 53 which are supported principally by the side walls of the cavity and the spacing insulators 47 and 48. Cathode 51 is provided with a cathode heating element 54, and terminals 55 and 56 thereof extend through the glass insulators 52 and 53 so as to be externally accessible. One of the cathode heating elements, such as conductor 55, may be connected to the cathode 51 so that it also serves as a cathode connection.

I provide conductor output means, such as a pair of anode conductors 57 and 58, which are connected to anode elements 45 and 46, respectively, and are electrically insulated from the top and bottom of the resonant cavity by means of sealing glass insulators 59 and 60.

Inasmuch as the system shown in Fig. 5, by virtue of the double anode construction, will rectify both positive and negative half cycles of potential incident to the electro-magnetic waves within the cavity, I may employ a circuit 61 comprising a transformer 62 to utilize effectively both positive and negative half cycles of the voltage obtainable from conductors 57 and 58. Circuit 61 also includes a source of unidirectional voltage, such as a battery 63, the negative terminal 63' of which is to be connected to the cathode 51 through conductor 55. A by-pass capacitance 64 may also be employed in the circuit 61. The inductance of transformer 62, together with the distributed capacitance of this circuit represented as capacitance 65, may constitute a circuit tuned substantially to the frequency of the voltage produced by and derived from conductors 57 and 58. An output or utilization circuit 66 may be energized through transformer 62.

It is to be understood that the circuit connections for conducting the energy derived from the resonant cavity are illustrated digrammatically and that the circuit for the utilization and extraction of the high frequency energy may constitute systems of conductors, such as concentric transmission lines or the equivalent thereof, peculiarly adapted for this purpose. In addition, circuit 61 is also diagrammatically illustrated and may comprise high frequency apparatus of particular configuration, such as concentric transmission lines or space resonant devices, for the utilization of the high frequency energy derived from the discharge device 40.

In operation, the space resonant cavity and associated electric discharge paths shown in Fig. 5 function to rectify the positive and negative half cycles of potential due to the standing electromagnetic wave within the cavity, furnishing a corresponding voltage across conductors 57 and 58. This type of operation will be effected when either of the input electrode means shown is energized to excite the cavity.

The device shown in Fig. 5 will also operate as a detector to produce an electrical condition such as a voltage across conductors 57 and 58, or to supply a voltage to circuit 61 which is representative of the nature of the electromagnetic waves established within the cavity or to furnish an indication of the voltage supplied by either of the electrode means.

One way in which the embodiment of my invention illustrated in Fig. 5 may be operated is as a detecting device, or detector, for producing and supplying to circuit 66 an electrical quantity which is representative of the modulating signal which is superimposed on a carrier frequency, in which case one of the electrode means, such as that comprising conductors 41 and 42, will be energized by the incoming signal comprising the carrier and modulating signal, and the received communication signal will be detected by the device 40 and supplied to circuit 61.

The device of Fig. 5 may also be operated as a frequency changer or mixer in which instance one of the input electrode means, such as the concentric line 43, will be energized from one source, such as a local oscillator, and the other electrode means, comprising conductors 41 and 42, may be energized in accordance with an incoming signal. The electromagnetic waves thus established within the resonant cavity will be a resultant of the two excitations to produce a resultant field having components equal to the sum and the difference of the two input electrode means. The resultant waves will be rectified by the double diode construction and the voltage appearing across conductors 57 and 58 will be of those frequencies. Circuit 61 may be tuned to discriminate between the two components, and the output circuit 66 will then be energized at the intermediate frequency chosen.

In Fig. 8 I have illustrated a still further embodiment of my invention comprising a metal bound resonant cavity 67 including a transverse wall structure also preferably positioned within the vicinity of the potential maximum of the standing electromagnetic wave therein. The transverse wall structure in the modification of my invention there illustrated may comprise a pair of metallic transverse partitions 68 and 69 forming a resonant aperture or slot 70. The partitions 68 and 69 are spaced longitudinally by a distance which is relatively small compared with the longitudinal dimension of the cavity and also serve as shielding means for electrode construction to be described presently.

Within the region defined by the transverse partitions 68 and 69, I provide a pair of electric discharge paths having a common thermionic cathode 71 and comprising, respectively, spaced and insulated anodes 72 and 73 which are spaced from the partitions 68 and 69 and which are completely shielded by the partitions. The anode structures 72 and 73 may be dimensioned to have rectangular faces, the principal dimensions of which are substantially coextensive with the longitudinal dimension of the resonant aperture or slot 70. As stated, the anodes 72 and 73 are electrically insulated and may be maintained in the position shown by means of glass or metal supporting stems 74 and 75, respectively, through which external conductors 76 and 77 extend. Conductors 76 and 77 are embedded in and extend through sealing glass insulators 78 and 79.

I may also provide electrostatic control means, such as grid wires or meshes 80 and 81, respectively, which may be welded or soldered to the partitions 68 and 69 and which constitute a means for defining part of the horizontal boundaries, that is the top and the bottom, of the resonant slot 70. Suitable input electrode means or output electrode means, such as a concentric line 82, may be employed in conjunction with the cavity as illustrated.

In Fig. 9 there is illustrated a cross sectional view of the transverse wall structure shown in Fig. 8 and corresponding elements have been assigned like reference numerals. The cathode 71 is there illustrated as comprising a heating element 83 having externally accessible terminals provided by conductors 84 and 85 which are supported by and sealed in glass insulators 86 and 87 which, in turn, are sealed to the walls of the resonant cavity 67. One of the conductors, such as conductor 84, may be conductively connected to the cathode 71, thereby serving also as a cathode connection.

The embodiment of my invention illustrated in Figs. 8 and 9 may be operated in various ways such as a rectifier, detector, or converter, and it is to be appreciated that the peculiar electrode construction or system is not restricted to any one particular type of high frequency conversion apparatus.

A still further modification of my invention is illustrated in Fig. 10 which comprises essentially the transverse wall construction and the associated electric discharge paths of Figs. 8 and 9 as applied to a resonant cavity 88 of the hollow-pipe type adapted for use as a converter or mixer. The elements of the arrangement of Fig. 10 having counterparts in Figs. 8 and 9 have been assigned like reference numerals. In addition, electrode means such as a concentric transmission line 89 is shown associated with the cavity so that two high frequency signals may be mixed and employed in an output circuit of the general nature of that shown in Fig. 5.

I also provide improved high frequency electric discharge devices of the space resonant type wherein the electric discharge paths are provided with shielded electrostatic control means, such as grids, positioned with respect to the resonant aperture so as to serve as effective means for controlling or modulating the output electrical condition derived from the cavity and for modulating the electromagnetic radiation with the cavity.

In the arrangement of Fig. 11, a metallically bound space resonant cavity 90 is provided with an electrode, such as a concentric line 91, and a transverse wall structure comprising a pair of metallic partitions 92 and 93 which have openings therein, preferably of rectangular shape, to provide a resonant slot 94. The partitions 92 and 93 may be welded or soldered to the top and bottom of the cavity 90 and are electrically connected thereto. The wall structure may be constructed of copper or any suitable metal having a relatively low electrical resistivity. I also provide associated with the resonant aperture 94 an electric discharge path, or a pair of electric discharge paths, comprising a thermionic cathode 95 and an anode 96, or a pair of anodes 96 and 97 which are connected in spaced relation with respect to cathode 95 and are also spaced from the partitions 92 and 93. These anodes may have, as illustrated in Fig. 12, a longitudinal or principal dimension substantially coextensive with the length of the resonant aperture and are maintained in spaced relation shown by means of glass or metal supporting means 98 and 99 which are insulated from the walls of the cavity 90 by means of sealing glass insulators 100 and 101 through which extend conductors 102 and 103 which are connected to anodes 96 and 97, respectively.

As shown in Fig. 12, taken in conjunction with Fig. 11, I provide shielded electrostatic control means, such as grids 104 and 105, which are conductively connected to the metallic partitions 92 and 93 and may serve as a boundary for defining the aperture longitudinally and may be welded to the horizontal edges of the apertures within partitions 92 and 93. These control means or grids serve as a means for equalizing instantaneous potentials of the electromagnetic field within the slot region. I also provide shielded electrostatic control means, such as grids, the potentials of which may be controlled in response to a predetermined electrical influence to modulate or control the electrons flowing in the respective electric discharge paths. The control grids may also be energized by unidirectional potentials, either positive or negative, to control the character of an electron beam transmitted between the cathode and the anodes to obtain particular characteristics desired, depending upon the nature of the application and use. These control grids, which are shielded by partitions 92 and 93, may comprise wire or mesh grids 106 and 107 which are supported by the side walls of the cavity by means of insulators 108, 109 and 110, 111, respectively. Conductors 112 and 113 may extend through the insulators 109 and 110, respectively, to serve as externally accessible means for controlling the potential of the grids 106 and 107 at will.

Cathode 95 is provided with a heating element 114 having externally accessible terminals 115 and 116, the former of which may also be employed as a cathode conductor.

The modification of my invention shown in Figs. 11 and 12 may be employed in a wide variety of ways. For example, it may be employed as a rectifier, detector, or frequency changer, the potentials of the grids 106 and 107 being controllable at will to modulate a received or transmitted signal.

In all of the modifications of my invention described above, it will be apparent that due to the resonant nature of the aperture of the transverse wall structure, the devices may be employed within the ultra high frequency field without entailing a decrease in the input impedance of the electrode means. This is an advantage not afforded by many of the prior art arrangements where it is desired to extend the field of high frequency application to the use of low wave-length electromagnetic waves within the vicinity of 1 to 10 centimeters. It will be further understood by referring to the above discussion relative to the particular constructions of the anode and cathode structures, that the anode and cathode are of appreciable area, thereby affording substantial conductance qualities or characteristics.

While I have shown and described my invention as applied to particular systems and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A cavity resonator, energizing means coupled to said cavity resonator for establishing electromagnetic waves therein, said cavity resonator including therewithin a wall defining a second resonator tuned substantially to the frequency of said energizing means for effecting a concentration of the electric field incident to the presence of the electromagnetic waves within said cavity resonator.

2. A cavity resonator, energizing means coupled to said cavity resonator for establishing electromagnetic waves therein, said cavity resonator including therewithin a wall having an aperture defining a second resonator tuned substantially to the frequency of said energizing means for effecting a concentration of the electric field incident to the presence of the electromagnetic waves within said cavity resonator.

3. A hollow metal chamber defining a cavity resonator, energizing means coupled to said cavity resonator for establishing electromagnetic waves within said chamber at substantially a natural frequency thereof, said chamber including therewithin a wall having an aperture defining a resonator tuned substantially to said natural frequency for effecting a concentration of the electric field incident to the presence of the electromagnetic waves within said chamber.

4. A cavity resonator, energizing means coupled to said cavity resonator for establishing electromagnetic waves therein at substantially a natural frequency thereof, said cavity resonator including therewithin a wall having an aperture defining a second resonator tuned substantially to said natural frequency for effecting a concentration of the electric field incident to the presence of the electromagnetic waves within said cavity resonator.

5. A cavity resonator, energizing means coupled to said cavity resonator for establishing electromagnetic waves therein, said cavity resonator including therewithin a wall having an aperture defining a second resonator tuned substantially to a natural resonant frequency of said cavity resonator for effecting a concentration of the electric field incident to the presence of the electromagnetic waves within said cavity resonator.

6. A cavity resonator, energizing means coupled to said cavity resonator for establishing electromagnetic waves therein, said cavity resonator including therewithin a wall having an aperture defining a second resonator tuned substantially to a natural resonant frequency of said cavity resonator and having an appreciable dimension transverse to the electric component of the electromagnetic field incident to said waves for effecting a concentration of the electric field incident to the presence of the electromagnetic waves within said cavity resonator.

7. A cavity resonator, energizing means coupled to said cavity resonator for establishing electromagnetic waves therein, said cavity resonator including therewithin a wall having an aperture defining a resonator tuned substantially to a natural resonant frequency of said cavity resonator and having appreciable dimension transverse to the electric component of the electromagnetic field incident to said waves and positioned within the vicinity of a voltage maximum of the standing potential wave within said cavity resonator.

8. A cavity resonator, energizing means coupled to said cavity resonator for establishing electromagnetic waves therein, and means for effecting a concentration of the electric field incident to the potential difference between a pair of walls of said cavity resonator due to the presence of the electromagnetic waves therewithin comprising a metallic wall within said resonator having an aperture defining a resonator tuned substantially to a natural resonant frequency of said cavity resonator, said aperture having a principal dimension across which substantially the entire said potential difference appears.

9. A cavity resonator, energizing means coupled to said cavity resonator for establishing electromagnetic waves therein, a second resonator within said cavity resonator for effecting a concentration of the electric field incident to said waves, and electric discharge means within said cavity resonator coupled to said second resonator.

10. A cavity resonator, energizing means coupled to said cavity resonator for establishing electromagnetic waves therein, said cavity resonator including therewithin a wall having an aperture defining a resonator tuned substantially to a natural resonant frequency of said cavity resonator, and electric discharge means coupled to said resonator having electrodes adjacent said aperture.

11. A cavity resonator, energizing means coupled to said cavity resonator for establishing electromagnetic waves therein, said cavity resonator including therewithin a wall having an aperture defining a resonator tuned substantially to the frequency of said electromagnetic waves, and electric discharge means coupled to said resonator having electrodes adjacent said aperture.

12. A cavity resonator, energizing means coupled to said cavity resonator for establishing electromagnetic waves therein, said cavity resonator including therewithin a wall having an aperture defining a resonator tuned substantially to a natural resonant frequency of said cavity resonator, and electric discharge means including a plurality of electrodes having a discharge path therebetween across said aperture.

13. A cavity resonator, energizing means coupled to said cavity resonator for establishing electromagnetic waves therein, said cavity resonator including therewithin a wall having an aperture defining a resonator tuned substantially to the frequency of said electromagnetic waves, and electric discharge means including a plurality of electrodes having a discharge path therebetween across said aperture.

14. A cavity resonator, energizing means coupled to said cavity resonator for establishing electromagnetic waves therein, said cavity resonator including therewithin a wall having an aperture defining a resonator tuned substantially to the frequency of said electromagnetic waves and having an appreciable dimension transverse to the electric component of the electromagnetic field incident to said waves and electric discharge means having electrodes adjacent said aperture and having a discharge path therebetween, said path extending across said aperture substantially in alignment with the said electric components thereacross.

15. A cavity resonator comprising a tuned section of dielectric wave guides of rectangular cross section, energizing means coupled to said cavity resonator for establishing electromagnetic waves therein, a wall within said cavity resonator having an aperture defining a resonator tuned substantially to the frequency of said waves and including a plurality of electrodes having a discharge path across said aperture.

16. A cavity resonator, energizing means coupled to said cavity resonator for establishing electromagnetic waves therein, and means for producing an electrical quantity variable in accordance with said electromagnetic waves and comprising a wall structure within said cavity resonator having an aperture defining a resonator tuned substantially to the frequency of said electromagnetic waves and including a plurality of electrodes having a discharge path across said aperture.

17. A cavity resonator, energizing means coupled to said cavity resonator for establishing electromagnetic waves therein, and means for producing an electrical quantity variable in accordance with said electromagnetic waves and comprising a wall structure within said cavity resonator having an aperture defining a resonator tuned substantially to the frequency of said electromagnetic waves and including an anode and a cathode having a discharge path across said aperture.

18. A cavity resonator, energizing means coupled to said cavity resonator for establishing electromagnetic waves therein, said resonator including therewithin a wall structure having an aperture defining a resonator tuned substantially to the frequency of said electromagnetic waves, and electric discharge means adjacent said aperture including anode and cathode means having discharge paths therebetween across said aperture.

19. A cavity resonator, energizing means coupled to said cavity resonator for establishing electromagnetic waves therein, said resonator including therewithin a wall structure having an aperture defining a resonator tuned substantially to the frequency of said electromagnetic waves, and electric discharge means comprising an anode constituting a portion of said wall structure defining one side of said aperture, a cathode constituting a portion of said wall structure defining the opposite side of said aperture, said anode and cathode having a discharge path therebetween across said aperture.

20. A cavity resonator, energizing means coupled to said cavity resonator for establishing electromagnetic waves therein, said resonator including therewithin a wall structure having an aperture defining a resonator tuned substantially to the frequency of said electromagnetic waves, and electric discharge means adjacent said aperture comprising a pair of anode elements and a cathode intermediate said anode elements, said anode elements and said cathode having discharge paths therebetween across said aperture.

21. A cavity resonator, energizing means coupled to said cavity resonator for establishing electromagnetic waves therein, said resonator including therewithin a wall structure having an aperture defining a resonator tuned substantially to the frequency of said electromagnetic waves, and electric discharge means comprising a pair of anodes constituting portions of said wall structure defining opposite sides of said aperture, a cathode positioned intermediate said anodes, said anodes and said cathode having discharge paths therebetween across said aperture.

22. A cavity resonator, energizing means coupled to said cavity resonator for establishing electromagnetic waves therein, and means for producing an electrical quantity variable in accordance with the magnitude of said electromagnetic waves and comprising a wall structure within said cavity resonator having an aperture defining a resonator tuned substantially to the frequency of said electromagnetic waves and including an anode and a cathode having a discharge path across said aperture.

23. A cavity resonator, energizing means coupled to said cavity resonator for establishing electromagnetic waves therein, and means for producing an electrical quantity variable in accordance with the magnitude of said electromagnetic waves and comprising a wall structure within said cavity resonator having an aperture defining a resonator tuned substantially to the frequency of said electromagnetic waves and including an anode and a cathode each constituting a portion of said wall structure on opposite sides of said aperture and having a discharge path across said aperture.

24. A cavity resonator, energizing means coupled to said cavity resonator for establishing electromagnetic waves therein, and full-wave rectifying means for producing an electrical quantity variable in accordance with the magnitude of said electromagnetic waves comprising a wall structure within said cavity resonator having an aperture defining a resonator tuned substantially to the frequency of said electromagnetic waves and electric discharge means comprising a pair of anodes on opposite sides of said aperture electrically insulated from said resonator and a cathode intermediate said anode elements, said anodes and said cathode having discharge paths therebetween across said aperture.

25. A cavity resonator, energizing means coupled to said cavity resonator for establishing electromagnetic waves therein, and full-wave rectifying means for producing an electrical quantity variable in accordance with the magnitude of said electromagnetic waves comprising a wall structure within said cavity resonator having an aperture defining a resonator tuned substantially to the frequency of said electromagnetic waves and electric discharge means comprising a pair of anode elements constituting portions of said wall structure defining opposite sides of said aperture and electrically insulated from said resonator, and a cathode intermediate said anode elements, said anodes and said cathode having discharge paths therebetween across said aperture.

26. A cavity resonator, energizing means coupled to said cavity resonator for establishing electromagnetic waves therein, said cavity resonator including therewithin a wall structure having an aperature defining a resonator tuned substantially to the frequency of said electromagnetic waves, said structure being constituted by spaced walls defining therebetween a shielded region, and electric discharge means comprising a plurality of electrodes within said region having a discharge path across said aperture.

27. A cavity resonator, energizing means coupled to said cavity resonator for establishing electromagnetic waves therein, said cavity resonator including therewithin a wall structure having an aperture defining a resonator tuned substantially to the frequency of said electromagnetic waves, said structure being constituted by spaced apertured walls conductively connected to said resonator and defining therebetween a region substantially shielded from electromagnetic waves within said resonator and electric discharge means comprising a plurality of electrodes within said region having a discharge path across said aperture.

28. A cavity resonator, energizing means coupled to said cavity resonator for establishing electromagnetic waves therein, said cavity resonator including therewithin a wall structure having an aperture defining a resonator tuned substantially to the frequency of said electromagnetic waves, said structure being constituted by a pair of apertured spaced metallic partitions, and electric discharge means comprising a plurality of electrodes between said partitions having a discharge path therebetween across at least a portion of said aperture.

29. A cavity resonator, energizing means coupled to said cavity resonator for establishing electromagnetic waves therein, said cavity resonator including therewithin a wall structure having an aperture defining a resonator tuned substantially to the frequency of said electromagnetic waves, said structure being constituted by a pair of apertured spaced metallic partitions, and electric discharge means comprising an anode and a cathode between said partitions in spaced insulated relation with respect to said resonator and having a discharge path therebetween across at least a portion of said aperture.

30. A cavity resonator, energizing means coupled to said cavity resonator for establishing electromagnetic waves therein, said cavity resonator including therewithin a wall structure having an aperture defining a resonator tuned substantially to the frequency of said electromagnetic waves for effecting a concentration of the electric field incident to said waves, said structure being constituted by a pair of apertured spaced metallic partitions, and electric discharge means comprising a pair of anodes between said partitions in spaced insulated relation with respect to said resonator, a cathode between said anodes, said anode and said cathode having therebetween a discharge path across at least a portion of said aperture.

31. A cavity resonator, energizing means coupled to said cavity resonator for establishing electromagnetic waves therein, said cavity resonator including therewithin a wall structure having an aperture defining a resonator tuned substantially to the frequency of said electromagnetic waves for effecting a concentration of the electric field incident to said waves, said structure being constituted by a pair of apertured spaced metallic partitions, and electric discharge means comprising a plurality of electrodes including a pair of anodes between said partitions on opposite sides of said aperture in spaced insulated relation with respect to said aperture, a cathode between said anodes and electrostatic control electrode means between said cathode and said anodes, said electrodes having a discharge path across said aperture.

32. A cavity resonator, energizing means coupled to said cavity resonator for establishing electromagnetic waves therein, said cavity resonator including therewithin a wall structure comprising a metallic member electrically insulated from said cavity resonator, a second metallic member conductively connected to said cavity resonator and defining with said first mentioned member an aperture defining a resonator tuned substantially to the frequency of said electromagnetic waves, and electric discharge means comprising an anode constituting a portion of one of said metallic members, and a cathode constituting a portion of the other of said metallic members, said anode and cathode having a discharge path across said aperture.

33. A cavity resonator, energizing means coupled to said cavity resonator for establishing electromagnetic waves therein, said cavity resonator including therewithin a wall structure comprising a metallic member electrically insulated from said cavity resonator, a second metallic member conductively connected to said cavity resonator and defining with said first mentioned member an aperture defining a resonator tuned substantially to the frequency of said electromagnetic waves, and electric discharge means comprising electrodes constituting portions of said members defining opposite sides of said aperture and having a discharge path thereacross.

34. A cavity resonator, energizing means coupled to said cavity resonator for establishing electromagnetic wave therein, said cavity resonator including therewithin a wall structure comprising a metallic member electrically insulated from said cavity resonator, a second metallic member conductively connected to said cavity resonator and defining with said first mentioned member an aperture defining a resonator tuned substantially to the frequency of said electromagnetic waves, and electric discharge means comprising an anode constituting a portion of said first mentioned metallic member, and a cathode constituting a portion of said second mentioned metallic member, said anode and cathode having a discharge path across said aperture.

35. An electric rectifier device comprising a cavity resonator, energizing means coupled to said cavity resonator for establishing electromagnetic waves therein, said cavity resonator including therewithin a wall structure having an aperture defining a resonator tuned substantially to the frequency of said electromagnetic waves and including a plurality of electrodes within said resonator having a discharge path across said aperture.

36. An electric rectified device comprising a cavity resonator, energizing means coupled to said cavity resonator for establishing electromagnetic waves therein, said cavity resonator including therewithin a wall structure having an aperture defining a resonator tuned substantially to the frequency of said electromagnetic waves, and electric discharge means connected to said resonator having a plurality of electrodes varying in potential in accord with potential established across said aperture by said electromagnetic waves.

37. A rectifier for electromagnetic waves comprising, a cavity resonator, a source of electrical energy to be rectified coupled to said cavity resonator for establishing electromagnetic waves therein, said cavity resonator including therewithin a wall structure having therein an aperture defining a resonator tuned substantially to the frequency of said waves, and electric discharge means including an anode and a cathode constituting portions of said wall structure and having a discharge path across said aperture for producing a unidirectional voltage the magnitude of which varies in accordance of the magnitude of the electromagnetic waves within said cavity resonator.

38. A rectifier for electromagnetic waves comprising, a cavity resonator, a source of electrical energy to be rectified coupled to said cavity resonator for establishing electromagnetic waves therein, said cavity resonator including therewithin a wall structure having therein an aperture defining a resonator tuned substantially to the frequency of said waves, and electric discharge means including a plurality of electrodes having a discharge path across said aperture for producing a uni-directional voltage the magnitude of which varies in accordance of the magnitude of the electromagnetic waves within said cavity resonator.

39. A rectifier for electromagnetic waves comprising a cavity resonator, a source of electrical energy to be rectified coupled to said cavity resonator for establishing electromagnetic waves therein, said cavity resonator including therewithin a wall structure having therein an aperture defining a resonator tuned substantially to the frequency of said waves, and electric discharge means including a pair of anodes constituting portions of said wall structure and a cathode intermediate said anodes, said anode and said cathode having therebetween a discharge path across said aperture, and means connected to said anodes and said cathode for producing a uni-directional voltage the magnitude of which varies in accordance of the magnitude of the electromagnetic waves within said cavity resonator.

40. In combination, a cavity resonator, means coupled to said cavity resonator for energizing said cavity resonator and establishing electromagnetic waves therein at a predetermined frequency, means coupled to said cavity resonator for energizing said cavity resonator and establishing electromagnetic waves therein at a second predetermined frequency, said cavity resonator including therewithin a wall having an aperture defining a resonator tuned substantially to said frequencies and electric discharge means connected to said resonator having electrodes whose potential varies in accord with potential established across said aperture by said electromagnetic waves for producing a unidirectional voltage which is a function of the resultant of said predetermined frequencies.

41. In combination, a cavity resonator, means coupled to said cavity resonator for energizing said cavity resonator and establishing electromagnetic waves therein at a predetermined frequency, means coupled to said cavity resonator for energizing said cavity resonator and establishing electromagnetic waves therein at a second predetermined frequency, said cavity resonator including therewithin a wall structure having an aperture defining a second resonator tuned substantially to said frequencies, electric discharge means connected to said second resonator including electrodes whose potential varies in accord with potential established across said aperture by said electromagnetic waves, and means connected to said electrodes for deriving a unidirectional voltage which is a function of the resultant of said predetermined frequencies.

42. In combination, a cavity resonator, means coupled to said cavity resonator for energizing said cavity resonator at a predetermined frequency, means coupled to said cavity resonator for energizing said cavity resonator at a second predetermined frequency, said cavity resonator including therewithin a wall structure having an aperture defining a second resonator tuned substantially to said frequencies, electric discharge means connected to said second resonator including electrodes having a discharge path across said aperture, and means connected to said electrodes for deriving a unidirectional voltage which is a function of the resultant of said predetermined frequencies.

43. In combination, a cavity resonator, means coupled to said cavity resonator for energizing said cavity resonator at a predetermined frequency, means coupled to said cavity resonator for energizing said cavity resonator at a second predetermined frequency, said cavity resonator including therewithin a wall structure having an aperture defining a second resonator tuned substantially to said frequencies, electric discharge means connected to said second resonator including electrodes constituting portions of said wall structure on opposite sides of said aperture and having a discharge path across said aperture, and means connected to said electrodes for deriving a unidirectional voltage which is a function of the resultant of said predetermined frequencies.

44. A generator of electromagnetic waves comprising a cavity resonator, means within said cavity resonator defining a resonator tuned substantially to a natural resonant frequency of said cavity resonator, electric discharge means including electrodes connected to said second mentioned resonator, and means connected to said electrodes for energizing said electric discharge means to generate electromagnetic waves in said cavity resonator.

45. A generator of electromagnetic waves comprising a cavity resonator, means within said cavity resonator defining a resonator tuned substantially to a natural resonant frequency of said cavity resonator, electric discharge means including electrodes connected to said second mentioned resonator, means connected to said electrodes for energizing said electric discharge means to generate electromagnetic waves in said cavity resonator, and means connected with said energizing means for varying the transit time of electrons passing between said electrodes to produce a negative-resistance characteristic in said generator whereby oscillations in said cavity resonator may be sustained.

46. A generator of electromagnetic waves comprising a cavity resonator, a wall structure within said cavity resonator having an aperture defining a resonator tuned substantially to a natural resonant frequency of said cavity resonator, electric discharge means including electrodes having a discharge path across said aperture, and means connected to said electrodes for energizing said electric discharge means to generate electromagnetic waves in said cavity resonator.

47. A generator of electromagnetic waves comprising a cavity resonator, a wall structure within said cavity resonator having an aperture defining a second resonator tuned substantially to a natural resonant frequency of said cavity resonator, electric discharge means connected to said second resonator and including electrodes whose potential varies in accord with potential established across said aperture by said electromagnetic waves, and means for energizing said electric discharge means to generate electromagnetic waves in said cavity resonator.

48. A generator of electromagnetic waves comprising a cavity resonator, a wall structure within said cavity resonator or having an aperture defining a resonator tuned substantially to a natural resonant frequency of said cavity resonator, electric discharge means including electrodes constituting portions of said wall structure on opposite sides of said aperture and having a discharge path across said aperture, and means connected to said electrodes for energizing said electric discharge means to generate electromagnetic waves in said cavity resonator.

49. A generator of electromagnetic waves comprising a cavity resonator, a wall structure within said cavity resonator having an aperture defining a resonator tuned substantially to a natural resonant frequency of said cavity resonator, electric discharge means including electrodes having a discharge path across said aperture, means connected to said electrodes for energizing said electric discharge means to generate electromagnetic waves in said cavity resonator, and means connected with said energizing means for varying the transit time of electrons passing between said electrodes to produce a negative resistance characteristic in said generator whereby oscillations in said cavity resonator may be sustained.

50. A generator of electromagnetic waves comprising a cavity resonator, a wall structure within said cavity resonator having an aperture defining a resonator tuned substantially to a natural resonant frequency of said cavity resonator, electric discharge means including electrodes constituting portions of said wall structure on opposite sides of said aperture and having a discharge path across said aperture, means connected to said electrodes for energizing said electric discharge means to generate electromagnetic waves in said cavity resonator, and means connected with said energizing means for varying the transit time of electrons passing between said electrodes to produce a negative resistance characteristic in said generator whereby oscillations in said cavity resonator may be sustained.

51. A cavity resonator, energizing means coupled to said cavity resonator for establishing electromagnetic waves therein, said cavity resonator including therewithin a wall having an aperture defining a second resonator tuned substantially to the frequency of said electromagnetic waves, and electric discharge means connected to said cavity resonator having electrodes whose potential varies in accord with potential established across said aperture by said electromagnetic waves.

52. A cavity resonator, energizing means coupled to said cavity resonator for establishing electromagnetic waves therein, said cavity resonator including therewithin a wall having an aperture defining a resonator tuned substantially to the frequency of said electromagnetic waves, and electric discharge means having electrodes connected to opposite sides of said aperture and varying in potential in accord with potential established across said aperture by said electromagnetic waves.

JAMES M. LAFFERTY.

REFERENCES CITED

The following references are of record in the file of this patent:

UNITED STATES PATENTS

| Number | Name | Date |
|---|---|---|
| 2,088,722 | Potter | Aug. 3, 1937 |
| 2,106,771 | Southworth | Feb. 1, 1938 |
| 2,129,713 | Southworth | Sept. 13, 1939 |
| 2,155,508 | Schelkunoff | Apr. 25, 1939 |
| 2,167,201 | Dallenbach | July 25, 1939 |
| 2,190,668 | Llewellyn | Feb. 20, 1940 |
| 2,223,082 | Van Mierlo | Nov. 26, 1940 |
| 2,242,275 | Varian | Mar. 20, 1941 |
| 2,253,503 | Bowen | Aug. 26, 1941 |
| 2,253,589 | Southworth | Aug. 26, 1941 |
| 2,287,845 | Varian et al. | June 30, 1942 |
| 2,314,794 | Linder | Mar. 23, 1943 |
| 2,372,193 | Fisk | Mar. 27, 1945 |
| 2,394,008 | Pierce | Feb. 5, 1946 |
| 2,413,963 | Fiske et al. | Jan. 7, 1947 |

Certificate of Correction

Patent No. 2,454,560.                                                                                   November 23, 1948.

JAMES M. LAFFERTY

It is hereby certified that errors appear in the printed specification of the above numbered patent requiring correction as follows:

Column 2, line 43, for "resonace" read *resonance*; column 7, line 32, before the word "one" insert *as a limit*; column 20, line 66, claim 36, for "rectified" read *rectifier*;

and that the said Letters Patent should be read with these corrections therein that the same may conform to the record of the case in the Patent Office.

Signed and sealed this 21st day of June, A. D. 1949.

[SEAL]

THOMAS F. MURPHY,
*Assistant Commissioner of Patents.*